United States Patent [19]
Slavitter

[11] Patent Number: 5,327,187
[45] Date of Patent: Jul. 5, 1994

[54] FILM CASSETTE HAVING A FORCE TRANSMITTING MEMBER MOTION GUIDING SURFACE INCORPORATED THEREIN

[75] Inventor: Frederick Slavitter, Needham, Mass.

[73] Assignee: Polaroid Corporation, Cambridge, Mass.

[21] Appl. No.: 997,164

[22] Filed: Feb. 16, 1993

[51] Int. Cl.⁵ .............................................. G03B 17/26
[52] U.S. Cl. ..................................... 354/275; 354/86; 354/304; 354/312
[58] Field of Search ................... 354/86, 87, 304, 312, 354/88, 313, 314, 276, 277

[56] References Cited

U.S. PATENT DOCUMENTS

| | | | |
|---|---|---|---|
| 2,991,702 | 7/1961 | Eloranta | 95/13 |
| 3,779,770 | 12/1973 | Alston et al. | 96/76 |
| 3,788,205 | 1/1974 | Pasieka et al. | 354/304 |
| 4,289,818 | 2/1981 | Buldini | 354/304 X |

Primary Examiner—D. Rutledge
Attorney, Agent, or Firm—John J. Kelleher

[57] ABSTRACT

A film cassette for an automatic film processor is provided with a cam surface for consistently and accurately guiding a force-transmitting member into and out of engagement with a pocket formed in a sheet element of a self-developing, peel-apart film unit enclosed therein, for the subsequent movement of the sheet element into a developer liquid spread system located in the film processor for engagement with other film unit elements.

9 Claims, 7 Drawing Sheets

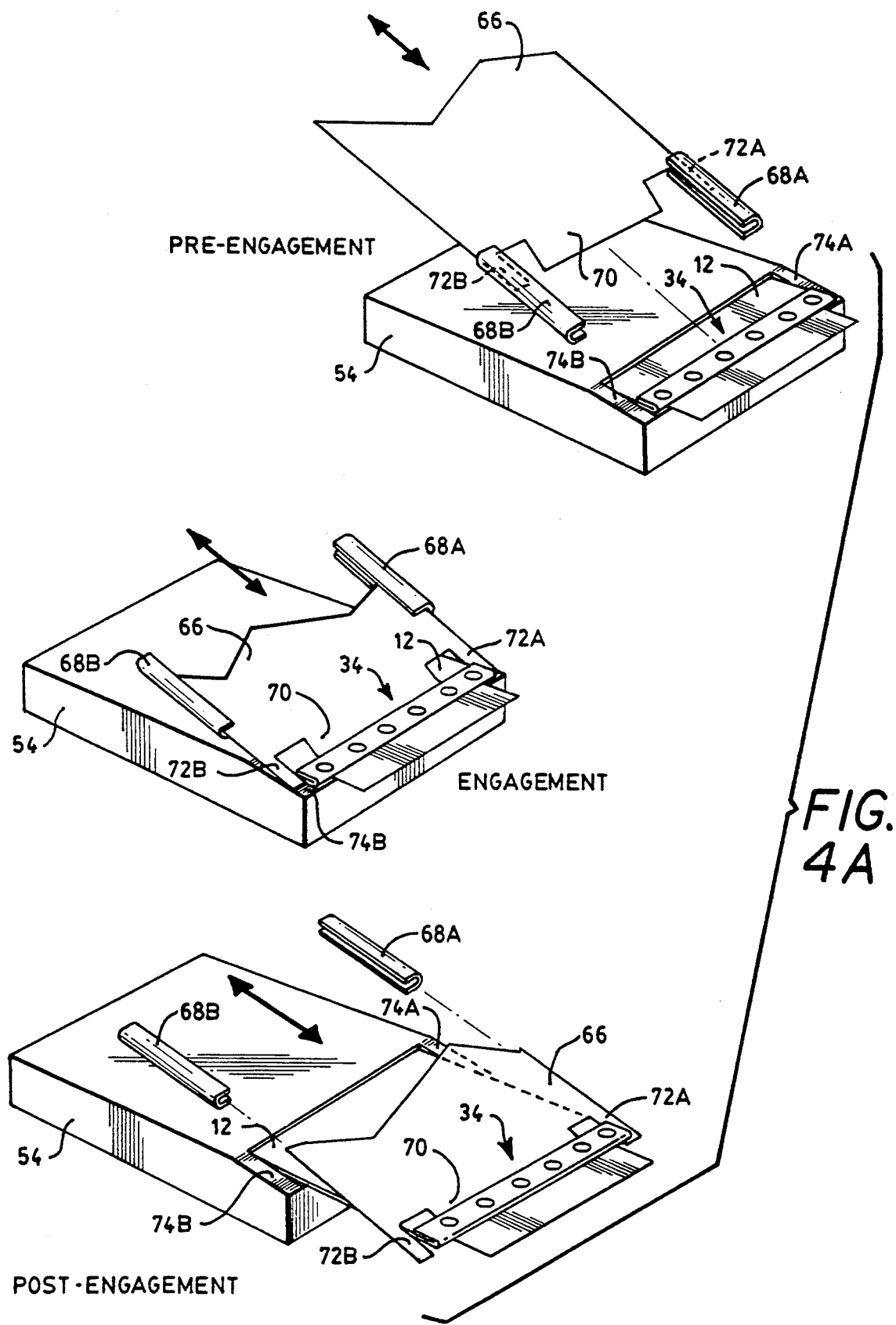

FILM CASSETTE HAVING A FORCE TRANSMITTING MEMBER MOTION GUIDING SURFACE INCORPORATED THEREIN

BACKGROUND OF THE INVENTION

1. Field of the Invention

The present invention relates to photographic apparatus for self-developing, peel-apart film, in general, and to a film cassette for an automatic film processor enclosing a plurality of self-developing, peel-apart film unit elements of the type having their leading ends adapted for engagement by a force-transmitting member for movement into or out of the film cassette for subsequent film unit processing, in particular.

2. Description of the Prior Art

Self-developing, peel-apart film units are well known in the field of instant photography. Each film unit comprises a negative or photosensitive sheet for forming a negative image of a subject, an image receiving sheet for forming a positive subject image and a rupturable pod of processing liquid. A positive images is formed by means of a well-known diffusion transfer process after the pod containing the processing liquid is ruptured and its contents spread between the positive and negative film sheets.

Film units of the aforementioned type are typically exposed and processed in portable, multiple-exposure, instant-type photographic cameras or processed in large format film processing equipment. When employed in a camera as many as ten film units are provided in a single lighttight film negative sheet on the other side of a pressure plate located within the film pack. Pull tabs are attached to one or both of the leading ends of the positive and negative sheets. After exposing an outermost negative sheet at a film plane of the camera a first tab attached to the negative sheet is withdrawn from the camera forcing the exposed negative to be turned 180° about the pressure plate and into superposition with the positive sheet. This movement causes a second tab attached to the forward ends of the positive and negative sheets to enter and pass through the bite of a pair of motor driven pressure applying spread rollers to a position exterior of the camera. A combination of the angle at which the first tab is attached and the force applied by a camera operator causes the first tab to detach from the negative sheet at this time.

After the first tab is so detached, the operator pulls the second tab so as to advance the positive and negative sheets between the pair of spread rollers in a superposed relation. At the beginning of the advancement of the positive and negative sheets the spread rollers apply pressure to a pod containing a processing liquid located at the leading ends thereof, thereby rupturing the same, and spreading its contents between the superposed sheets in a thin uniform layer as the sheets are advanced therebetween. A positive image is formed on the positive sheet outside of the camera by a well known diffusion transfer process. After a required interval of time the positive sheet is peeled away from the negative sheet and the negative sheet, along with the second tab attached thereto are discarded. A more detailed description of this particular type of peel-apart film may be found at pages 185–187 of a book entitled, "Camera Technology" by Norman Goldberg published in 1992 by the Academic Press.

The above-described peel-apart film format has several disadvantages, especially if considered for use in certain photographic apparatus. One disadvantage is film cost. In addition to the multiple tabs and the relatively large amounts of leader material required for each film unit, which necessarily increases material costs, economies of scale are limited by the fact that both a positive and negative sheet must be included within a single film cassette in order to take advantage of such economies, which would substantially increase cassette size and thereby make such a cassette unwieldy for use by a camera operator. Another disadvantage is that this type of film format is not susceptible of inclusion in highly automated film processing equipment. Processing a film unit by pulling certain tabs at various times in the film processing cycle is clearly a processing technique that is inherently manual.

In U.S. patent application Ser. No. 936,513 filed Aug. 28, 1992 by Polizzotto et al., and assigned to the assignee of the present application, an improved film format for a self-developing, peel-apart film unit is disclosed that was specifically designed for use in highly automated photographic apparatus utilizing peel-apart film. A film unit 10 incorporating this improved film format is shown in drawing FIGS. 1A and 1B. The film unit comprises both positive and negative sheet elements with each having pockets formed on a surface of a leading end thereof. A force-transmitting member (or members) engage these sheet element pockets and move the so engaged sheet elements, in a mated configuration, into the bite of a pair of spread rollers in a conventional developer liquid spread system of an automatic film processor in order to initiate the film developing process.

A major problem associated with a photographic sheet element transport system of this type is the inability to consistently insert a force-transmitting member into a sheet element pocket and thereby avoid a sheet element misfeed into, for example, the developer liquid spread system. If the force-transmitting member fails to enter a sheet element pocket formed on a surface thereof, sheet element movement into the developer liquid spread system cannot occur. A correlative problem is the inability to consistently withdraw the force-transmitting member from the sheet element pocket without damaging a sheet element surface. If the path of force-transmitting member movement is not controlled while being withdrawn from the sheet element pocket for movement back toward its start or initial position, it may be dragged across and thereby scratch a sheet element surface. The photosensitive layer of the negative sheet element of a self-developing photographic film unit would be particularly susceptible to such force-transmitting member movement damage.

SUMMARY OF THE INVENTION

In accordance with the teachings of the present invention a film cassette for an automatic film processor is provided which will enable a force-transmitting member of a film transport system incorporated therein to consistently engage and transport a sheet element of a self-developing, peel-apart film unit into certain photographic apparatus for subsequent sheet element/film unit processing. The film cassette encloses a plurality of sheet elements, in a stacked relation, and has a cam surface thereon for engaging a first portion of the force-transmitting member. Each sheet element includes a pocket formed on a surface of a leading end thereof for engagement by a second portion of the force-transmitting member. During a film processing cycle the first portion of the moving force-transmitting member engages the film cassette cam surface and thereby guides the second portion thereof into the sheet element pocket for subsequent sheet element movement.

It is a primary object of the present invention, therefore, to provide a film transport system for consistently transporting a sheet element of a self-developing, peel-apart film unit into and/or out of certain photographic apparatus.

It is another object of the present invention to provide a film transport system for transporting a sheet element of a self-developing, peel-apart film unit into and/or out of certain photograph apparatus without damaging a sheet element surface.

It is a further object of the present invention to provide a film transport system for consistently transporting a sheet element of a self-developing, peel-apart film unit into a gap between a pair of spread rollers of a developer liquid spread system.

Other objects, features and/or advantages of the present invention will be readily apparent from the following detailed description of a preferred embodiment thereof when taken in conjunction with the accompanying drawings.

BRIEF DESCRIPTION OF THE DRAWINGS

FIG. 4A is a perspective view of a force-transmitting member and a film cassette of the present invention showing the force-transmitting member at various positions during a sheet element movement cycle;

DESCRIPTION OF THE PREFERRED EMBODIMENT

Figure 1:
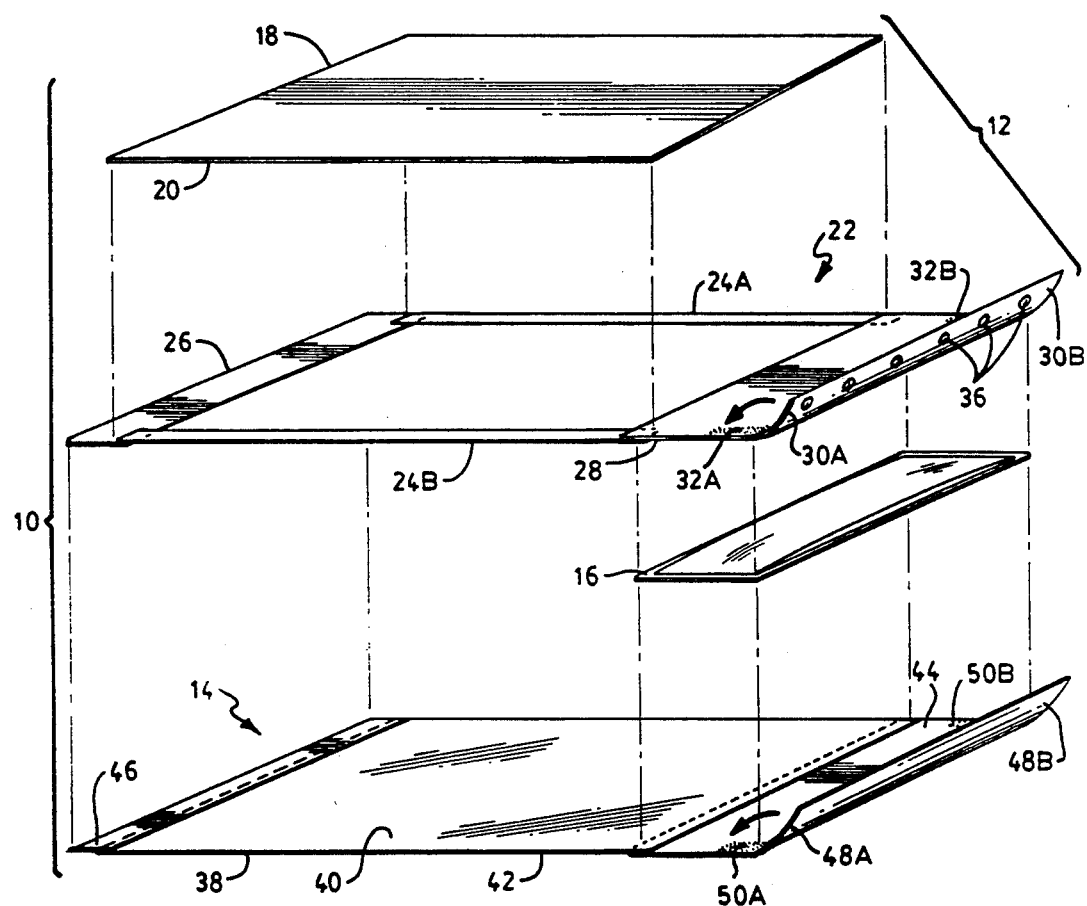
FIG. 1 is an exploded perspective view of the component parts of a self-developing peel-apart film unit of the type enclosed by the film cassette of the present invention.
Figure 1B:
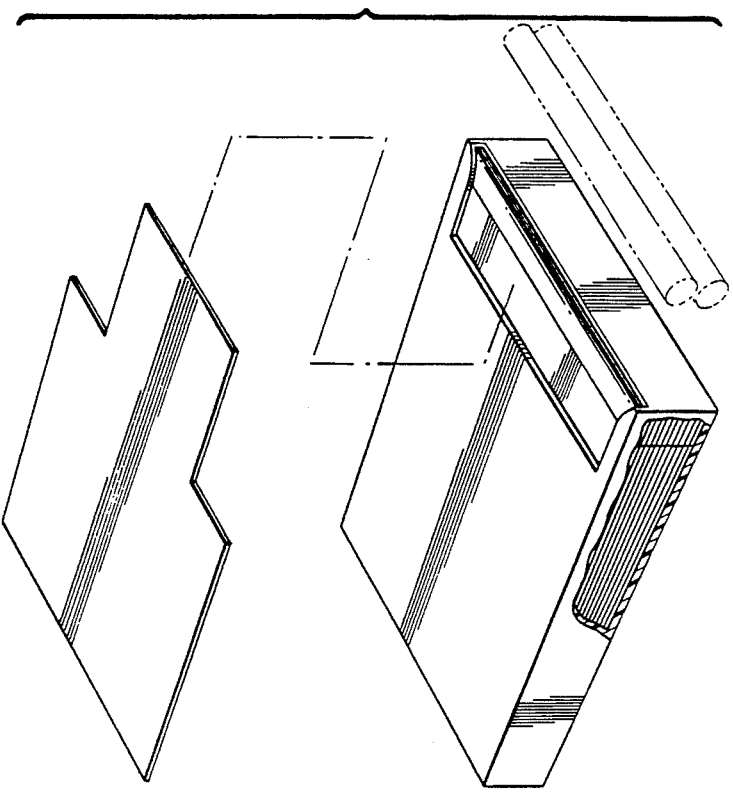
FIG. 1B is a perspective view of a stack of photographic sheet elements enclosed in a film cassette for movement into a pair of developer liquid spread rollers by a force transmitting member in accordance with the prior art.
Figure 1A:
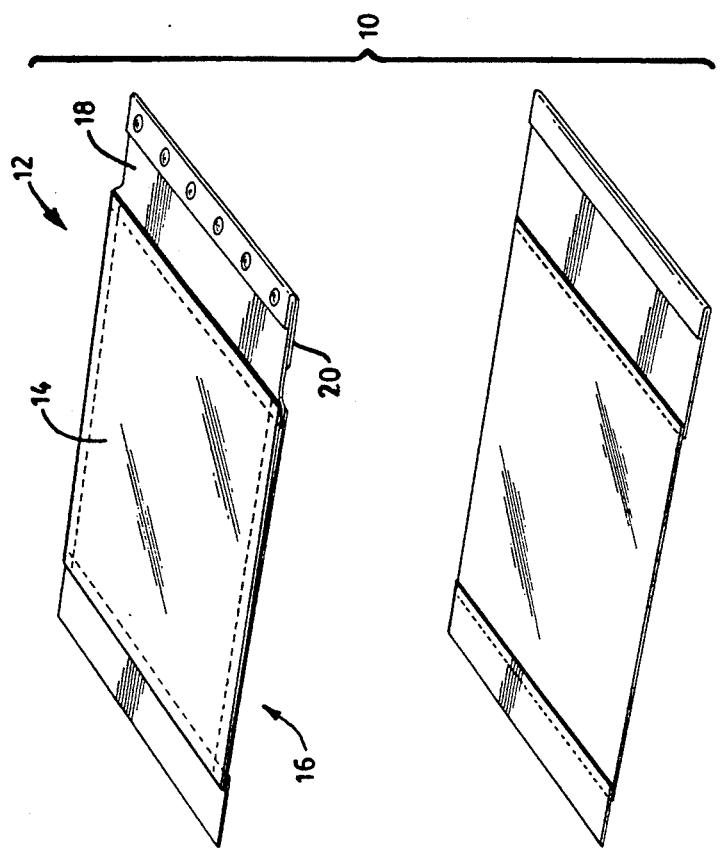
FIG. 1A is a perspective view of positive and negative sheet elements of a self-developing peel-apart film unit in accordance with the prior art.
Figure 2:
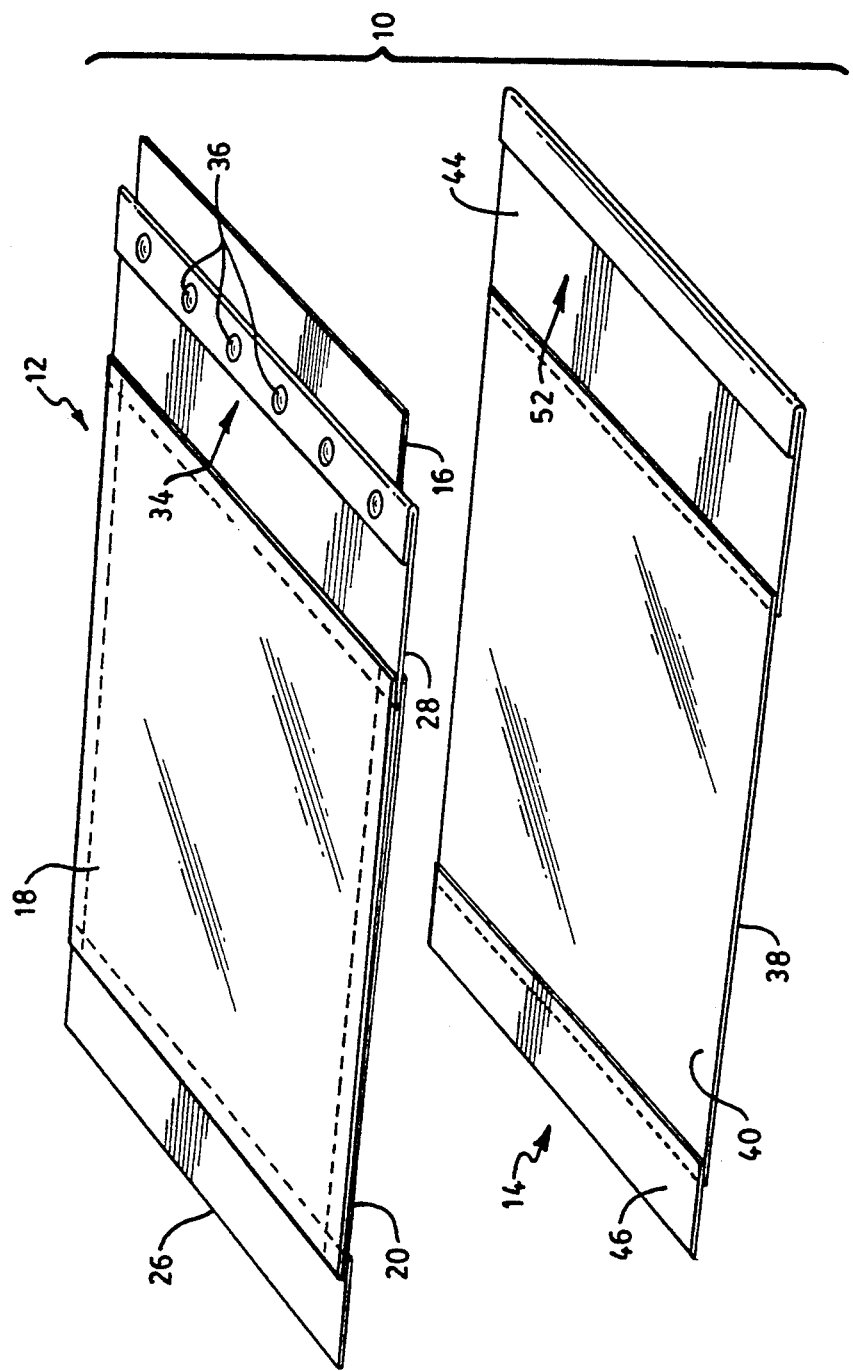
FIG. 2 is a perspective view of the self-developing peel-apart film unit of FIG. 1 showing its positive and negative sheet elements fully assembled

Referring now to the drawings, and specifically to FIGS. 1 and 2, there is respectively shown exploded and assembled perspective views of sheet elements of a self-developing peel-apart film unit 10 of the type enclosed by the film cassette of the present invention. The film unit 10 comprises a positive sheet element 12, a negative sheet element 14 and a rupturable pod of processing liquid 16.

The positive sheet element 12 includes a rectangular sheet 18, formed of a transparent polyester material, which has an image-receiving layer 20 applied to the bottom surface thereof. Positive sheet element 12 also includes a frame or image mask 22 for adhesive attachment to the border of the polyester sheet 18, on the image-receiving layer side thereof. The mask 22 is comprised of four separate pieces which include a pair of side strips 24A, 24B, a trailing strip 26 and a leader 28.

The leading end of the leader 28 is folded back on itself and the sides 30A, 30B thereof are adhesively attached to the sides 32A, 32B, respectively, of the mask leader 28 to form a pocket 34 (FIG. 2) on one surface thereof. A series of inwardly projecting raised portions or dimples 36 are formed in the leader pocket in order to maintain a minimum size opening so that a force transmitting member may be readily inserted therein. The pod of processing liquid 16 is adhesively attached to a surface of the leader 28 on the side opposite the pocket 34 and extends beyond the leading end of the leader 28.

The negative sheet element 14 includes a rectangular sheet 38, formed of a polyester material, which has a photosensitive layer 40 applied to the top surface and a carbon-based opacifying layer 42 applied to the bottom surface. A leader 44 is adhesively attached to the leading end and a trailing strip 46 is adhesively attached to the trailing end of the polyester sheet 38. Both the leader 44 and the trailing strip 46 are made of paper. The leading end of the leader 44 is folded back on itself, on the same side as the photosensitive layer 40 of the negative sheet element 14, and the sides 48A, 48B thereof are adhesively attached to the sides 50A, 50B, respectively, of the leader 44 to form a pocket 52 (see FIG. 2).

Figure 3A:
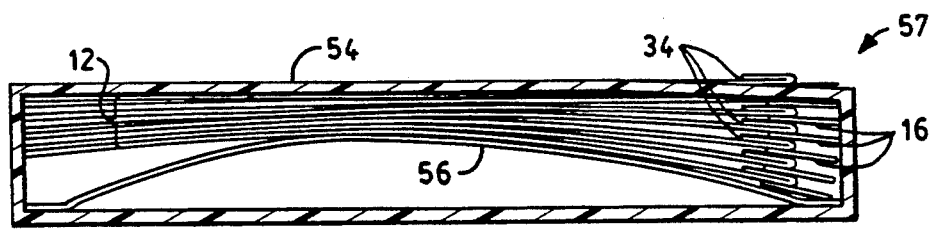
FIG. 3A is a side elevational view, partly in section, of a first film cassette of the present invention shown with a plurality of positive sheet elements enclosed therein.

With additional reference to FIG. 3A of the drawings, a plurality of positive sheet elements 12, each having a pod of developer liquid 16 attached thereto, in the above-described manner, are placed within a cassette 54 in a stacked relation during film manufacture. The pockets 34 of the positive sheet elements 12 together with the dimples 36 formed therein are positioned in an upward facing orientation and the pods 16 of developer liquid located on the leading end of each of said positive sheet elements on a side opposite the pockets 34, are in a downward facing orientation. The cassette 54 additionally includes a conventional spring 56 located at the bottom of the stacked positive sheet elements 12 for successively urging each of said sheet elements into alignment with an exit opening 57.

Figure 3B:
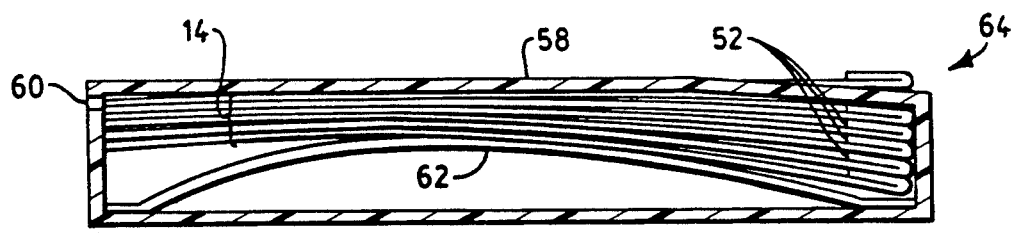
FIG. 3B is a side elevational view, partly in section, of a second film cassette of the present invention shown with a plurality of negative sheet elements enclosed therein.

A plurality of negative sheet elements 14 have been transferred from photographic apparatus (not shown) in which they were exposed, by a transfer mechanism (not shown), into a cassette 5B in a stacked relation as shown in drawing FIG. 3B. The exposed negative sheet elements 14 were serially inserted into the cassette 58 through an entrance slot 60 in one end thereof. The pockets 52 thereof are positioned in an upward facing orientation and a spring 62 is provided to successively urge each negative sheet element into alignment with a cassette exit opening 64.

Figure 4B:
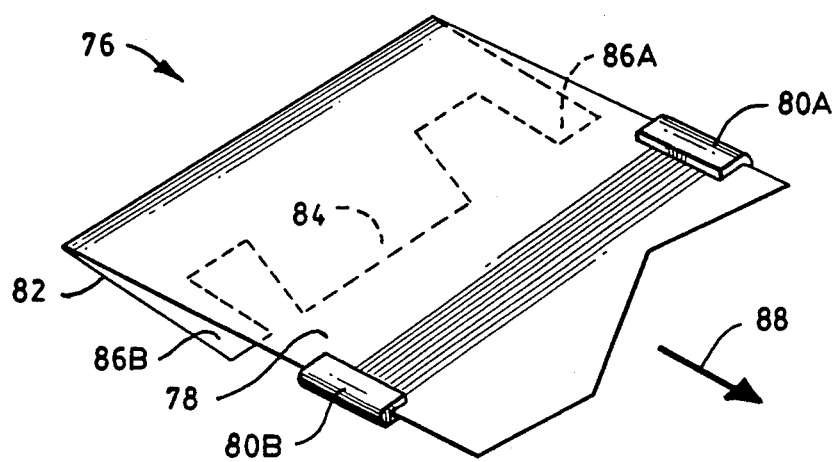
FIG. 4B is an alternate configuration for the sheet element moving force-transmitting member shown in FIG. 4A.

A positive sheet element 12 and a negative sheet element 14 are extracted from the cassettes 54 and 58, respectively, and are combined as a film unit in a light-tight environment within an automatic film processor (not shown) for subsequent film unit processing. The positive sheet element 12 and the negative sheet element 14 are so combined for such processing in the following manner. A manually activated control system (not shown) in the film processor causes conventional drive means (not shown) to move a force-transmitting or pick member 66 into the pocket 34 of uppermost positive sheet element 12 located within the film cassette 54 for engagement therewith, as shown in drawing FIG. 4A. With additional reference to FIG. 4A, the pick member 66 is supported for slidable movement within a pair of support channels 68A 68B. The channels 68A and 68B are supported by the film processor. FIG. 4A shows the positioned relationship between the pick member 66 and the positive sheet element 12 before, during and after sheet element engagement and subsequent withdrawal from the cassette 54.

In this the preferred embodiment the pick member 66 includes a generally planar portion which is slidably supported by the pair of channel members 68A and 68B mentioned above. The loading end of this planar pick member portion is divided into three segments comprising the center or pocket-engaging segment 70 and two outer or pick-guiding segments 72A and 72B. The pick-guiding segments 72A and 72B are located in the plane of the above-noted planar portion of the pick member 66. However, the pocket-engaging segment 70 thereof is located in a different plane that is oriented at an acute angle thereto and which projects downward toward the pocket 34 of the positive sheet element 12 within the film cassette 54.

In addition, the film cassette 54 includes a pair of motion-guiding surfaces 74A and 74B for guiding the motion of pick member 66. During a film processing cycle drive means within the automatic peel-apart film processor moves the pick member 66 forward and toward the positive sheet element containing film cassette 54 for the purpose of extracting a positive sheet element 12 therefrom. As the pick member 66 is moved toward the cassette 54, the pick-guiding segments 72A and 72B are initially engaged by the pick-guiding surfaces 74A and 74B, respectively. The cassette surfaces 74A and 74B guide the downward projecting pick member segment 70 into the pocket 34 of the positive sheet element 12 as the above-mentioned drive means within the automatic film processor continues to drive the pick member 66. Further forward movement of the now-engaged pick member 66 by the processor drive means causes the positive sheet element 12 to be advanced from the film cassette 54 until a leading edge of the pod 16 is moved into a pocket 52 of an exposed negative sheet element 14 which, though not described herein, was previously advanced from the negative film cassette 58. The negative sheet element 14 was moved from the negative cassette 58 in the same manner that the above-described positive sheet element 12 was extracted from the positive film cassette 54.

When forward movement of the positive sheet element by the pick member is complete, the above-mentioned film processor drive means reverses the direction of pick member 66 for movement back to its initial position. During such reverse direction movement the pick-guiding segments 72A and 72B of the pick member 66 once again respectively engage cassette surfaces 74A and 74B which, in turn, precludes the center segment 70 thereof from contacting and possibly damaging a positive sheet element surface.

The pick member 66 has been described above as a force transmitting member that moves a positive sheet element 12 from a positive film cassette 54 by engaging a pocket 34 on one side thereof and subsequently pushing the sheet element 12 out of the film cassette 54. However, an alternate embodiment of the pick member 66 may be employed for such sheet movement purposes. With additional reference to FIG. 4B of the drawings there is shown a positive (or negative) sheet element moving, force-transmitting or pick member 76. The pick member 76 includes a generally planar portion 78 which is slidably supported by a pair of channel members 80A and 80B. The channel members 80A and 80B are supported by the film processor. The entire trailing end 82 of the planar portion 78 is bent at an acute angle with respect to said planar portion 78. The trailing end 82 is divided into three segments comprising a center or pocket-engaging segment 84 and two outer or pick-guiding segments 86A and 86B. The pick-guiding segments 86A and 86B are located in the plane of the trailing end 82. However, the pocket-engaging segment 84 thereof extends along a downward projecting plane that is at a greater angle to the planar portion 78 of the pick member 76 than is the plane of the trailing end 82.

During a film processing cycle drive means within the automatic peel-apart film processor (not shown) moves the pick member 76 toward the positive sheet element containing film cassette 54 for the purpose of extracting a positive sheet element 12 therefrom. As the pick member 76 is moved toward the cassette 54, the pick-guiding segments 86A and 86B are initially engaged by the pick-guiding surfaces 74A and 74B, respectively. The cassette surfaces 74A and 74B guide the downward projecting pick member segment 84 into the pocket 34 of the positive sheet element 12 as the above-mentioned drive means within the automatic film processor continues to drive the pick member 76. Further forward movement of the now-engaged pick member 76 by the processor drive means causes the positive sheet element 12 to be extracted from the film cassette 54 and moved into the pocket 52 of an exposed negative sheet element 14. Whereas the previously described pick member 66 extracts a positive sheet element 12 by pushing it out of the positive film cassette 54, the pick member 76 described above with respect to FIG. 4B pulls the positive sheet element 12 out of the positive film cassette 54. The pick member 76 pulls a positive sheet element 12 from the positive film cassette for subsequent film processing when driven by drive means within the automatic film processor in a direction 88.

Figure 5:
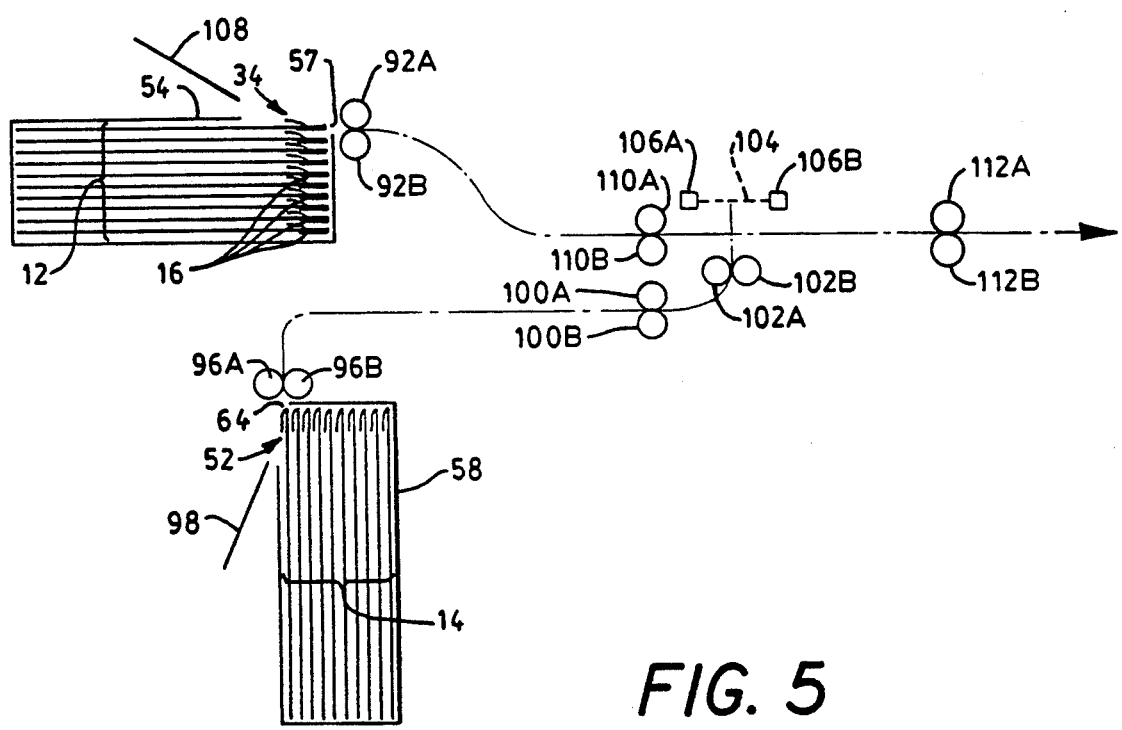
FIG. 5 is a transport system for transporting positive and negative sheet elements of a peel-apart self-developing film unit from film cassettes of the present inventions into a developer liquid spread system of a film processor.

A positive sheet element 12 and an exposed negative sheet element 14 are transported into a film processor spread system for registration and subsequent processing, in the following manner. As shown in FIG. 5, which is a top view of a transport system and spread rollers for the automatic film processor, film exit slots of the positive sheet element containing cassette 54 and the negative sheet element containing cassette 58 are placed in the automatic film processor, with each such exit slot adjacent a pair of cooperating film transport rollers. An exit slot 57 of the positive film cassette 54 is positioned adjacent a pair of cooperating motor (not shown) drive film transport rollers 92A, 92B, and an exit slot 64 of the negative film cassette 58 is positioned adjacent another pair of film transport rollers 96A, 96B.

A manually activated control system (not shown) initially causes a force transmitting member or pick 98 to engage the pocket 52 on the uppermost sheet element of the negative film sheet elements 14 stacked within the negative film cassette 58 and then moves it into the bite of the transport roller pair 96A, 96B. The pick 98 has the same design as the pick member 66 shown in FIG. 4A. Transport roller pair 96A, 96B, which are motor driven (motor not shown), move the negative sheet element 14 for movement through a second pair of motor driven transport rollers 100A, 100B and then through a third pair of motor driven transport rollers 102A, 102B so that the leading edge thereof is positioned at a location 104. A pair of sensors 106A, 106B, determine when the leading edge of the negative sheet element 14 has been positioned to the location 104 and generates a signal in response thereto which interrupt power to the drive motor of the transport roller pairs 96A and 96B, 100A and 100B, and 102A and 102B.

After the leading edge of the negative sheet element 14 has been positioned to the location 104, the abovementioned manually activated control system also causes an additional force transmitting member or pick 108 to engage the pocket 34 on the uppermost sheet element of the stack of positive sheet elements 12 within the positive film cassette 54 and then move it into the bite of the transport roller pair 92A, 92B. The pick 108 has the same design as the pick 98 described above in conjunction with the negative film cassette 58. Transport roller pair 92A, 92B, which are also motor driven, move the positive sheet element 12 for movement through a second pair of motor driven transport rollers 110A, 110B. The transport roller pair 110A, 110B, in turn, move the projecting developer liquid pod 16 of the positive sheet element 12 into the pocket 52 of the negative sheet element 14 for subsequent movement therewith. The leading edge of the pod 16 engages and then bends the leading end of the negative sheet element 14 so that the leading end of the pod 16 can enter the pocket 52 thereof. The negative sheet element 14 has been previously positioned such that the pocket 52 thereof is located in the path of the positive sheet element 12. The so engaged positive sheet element 12 and the negative sheet element 14 (collectively referred to herein as the film unit 10) are transported by the transport rollers 110A, 110B into the bite of a pair of processing rollers 112A, 112B. The processing rollers 112A, 112B, in turn, rupture the pod of processing liquid 16 and spread its contents between the photosensitive layer on the negative sheet element 14 and the image-receiving layer on the positive sheet element 12 to thereby initiate image processing by means of a well-known dye-diffusion transfer process. After the requisite amount of processing time has elapsed, that portion of the positive sheet element containing the transferred positive image is peeled from a combination of the negative sheet element and the paper mask 22 forming a portion of the positive sheet element, to thereby reveal a fully developed positive image.

From the foregoing description of the invention it will be apparent to those skilled in the art that various improvements and modifications can be made in it without departing from its true scope. The embodiments described herein are merely illustrative and should not he viewed as the only embodiments that might encompass the invention.

What is claimed:

1. A film cassette for photographic apparatus, of the type having a force-transmitting member for moving a photographic sheet element of a self-developing, peel-apart film unit into or out of the apparatus for subsequent sheet element processing, comprising a cassette for enclosing a plurality of photographic sheet elements, in a stacked relation, of the type wherein each such sheet element has a leading end with a pocket on one side thereof for engagement with the force-transmitting member, said cassette having a motion-guiding surface thereon for engaging a first portion of the force-transmitting member for the purpose of guiding a second portion of the force-transmitting member into the sheet element pocket, for movement therewith.

2. The film cassette of claim 1 wherein said cassette includes a leading end from which photographic sheet elements may be extracted and opposed side portions, and force-transmitting member motion-guiding surfaces are located adjacent each of said side portions, at said leading end.

3. The film cassette of claim 1 wherein the sheet elements of the self-developing, peel-apart film unit enclosed by the cassette are positive sheet elements.

4. The film cassette of claim 1 wherein the sheet elements of the self-developing, peel-apart film unit enclosed by the cassette are negative sheet elements.

5. The film cassette of claim 4 wherein said cassette for enclosing the negative sheet elements is lighttight.

6. The film cassette of claim 1 wherein said cassette has a plurality of motion-guiding surface thereon.

7. A film transport system for moving a sheet element of a self-developing, peel-apart photographic film unit into or out of photographic apparatus comprising:
   a peel-apart film-sheet element having a leading end and having a pocket located on one side of said leading end;
   a cassette for enclosing a plurality of peel-apart film-sheet elements arranged in a stacked relation, said cassette having a withdrawal opening therein for the sequential movement of each of said sheet elements therethrough and having a force-transmitting member, motion-guiding surface thereon; and
   a moveably mounted force-transmitting member having a first portion for engaging the sheet element pocket and having a second portion thereof for engaging said motion-guiding cassette surface and thereby guiding said first force-transmitting member portion into said sheet element pocket, for the subsequent movement of the sheet element through said cassette withdrawal opening.

8. The film transport system of claim 7 wherein said force-transmitting member moves a sheet element of a self-developing peel-apart film unit by pushing said sheet element through said cassette withdrawal opening.

9. The film transport system of claim 7 wherein said force-transmitting member moves a sheet element of a self-developing peel-apart film unit by pulling said sheet element through said cassette withdrawal opening.

* * * * *